United States Patent
Bhatia et al.

[11] Patent Number: 6,014,556
[45] Date of Patent: Jan. 11, 2000

[54] METHOD FOR PRIORITY IN TERMINATING CALL SETUP

[75] Inventors: Ranjit Bhatia, Lewisville; Patrick Arabie, Plano, both of Tex.

[73] Assignee: Ericsson Inc., Research Triangle Park, N.C.

[21] Appl. No.: 08/893,215

[22] Filed: Jul. 15, 1997

[51] Int. Cl.[7] .................................................. H04M 11/00
[52] U.S. Cl. .................................... 455/404; 455/512
[58] Field of Search .................................. 455/403, 404, 455/414, 445, 458, 500, 507, 512, 516, 517, 520, 521, 422, 561; 379/201, 211

[56] References Cited

U.S. PATENT DOCUMENTS

| | | | |
|---|---|---|---|
| 5,438,616 | 8/1995 | Peoples | 379/201 |
| 5,475,745 | 12/1995 | Boyle | 379/201 |
| 5,504,939 | 4/1996 | Mayrand et al. | 455/34.1 |
| 5,557,664 | 9/1996 | Burns et al. | 379/114 |
| 5,570,411 | 10/1996 | Sicher | 379/57 |
| 5,689,548 | 11/1997 | Maupin et al. | 455/404 |
| 5,712,900 | 1/1998 | Maupin et al. | 455/433 |

FOREIGN PATENT DOCUMENTS

| | | |
|---|---|---|
| 0 491 494 A2 | 12/1991 | European Pat. Off. . |
| 0 717 579 A2 | 11/1995 | European Pat. Off. . |
| WO 96/33584 | 10/1996 | WIPO . |

*Primary Examiner*—Nguyen Vo
*Attorney, Agent, or Firm*—Jenkens & Gilchrist, P.C.

[57] ABSTRACT

A method for enabling prioritized call connection between an originating caller and a terminating caller is disclosed. A requests from an originating caller to a mobile station for call connection includes a call priority identifier in order to expedite connection of the originating caller to the mobile station. The mobile station utilizes the same call priority identifier provided by the originating caller to prioritize its request for a response to the originating caller's page and the setup of the traffic channel between the originating caller and mobile station.

10 Claims, 3 Drawing Sheets

METHOD FOR PRIORITY IN TERMINATING CALL SETUP

BACKGROUND OF THE INVENTION

1. Technical Field of the Invention

The present invention relates to a mobile telecommunications network, and more particularly, to a method for prioritizing call paging and terminating call setup.

2. Description of Related Art

Priority call connection is an area of significant interest in cellular communications systems since the number of calls which are handled by a cellular system is limited to the number of allocated channels. Many situations may require an expedited connection, for example, the emergency service bureau (ESB), more commonly known in the United States as 9-1-1 service, provides emergency assistance to persons in need of help. A mobile telephone subscriber seeking emergency services, merely has to dial a short unique number (such as 911 in the U.S.) to establish a fast emergency call connection with a public safety answering point (PSAP) providing the ESB service. Once the emergency call has been setup, the mobile station may then transmit signals to and receive signals from the PSAP. If the emergency call connection fails in some manner, the operators at the PSAP must make a return call to the subscriber in order to make sure that the emergency has been satisfactorily taken care of or determine if additional help is still needed.

A problem arises when the PSAP is trying to reconnect the terminated call. While the originating call from the PSAP may be prioritized due to the location from which the call originated, there is no priority assigned from the PSAP to the mobile subscriber. Thus, the call paging and channel assignment processes between the PSAP and the subscriber will not have priority over normal traffic and paging channel assignment. A manner for assuring quicker connection to the disconnected subscriber would be greatly beneficial.

Businesses could also benefit from prioritized call connection services. For example, in situations where a company may need to get in touch with employees, salesmen, etc. that are working within the field and only are able to be contacted through a mobile station, prioritizing a call connection to and form the employee could provide a substantial marketing advantage to a company. The company may of course contact the remote employee through standard cellular communications methods. However, the calls are assigned no greater priority then any other call being processed by the cellular communications system. If time is of the essence, a manner in which both the originating call from the company and the terminating call response from the employee could be prioritized over existing cellular traffic would be a premium service which might be provided by cellular system providers for an additional fee.

SUMMARY OF THE INVENTION

The present invention comprises a method for prioritizing the call connection procedure between an originating caller and a terminating caller at a mobile station. Initially, a paging message is transmitted from the originating call to a MSC/VLR serving the mobile station that is being contacted in a wireless system. The paging message is then forwarded to the base station serving the mobile station. The paging message includes a call priority identifier that indicates to switching equipment that the call setup procedures for the call are to be granted the highest priority for the paging and call connection process.

The mobile station is paged over a paging channel assigned on the basis of the priority indicated by the call priority identifier. In response to the page, the mobile station requests assignment of a paging response channel to the base station. The paging request response passes on the call priority identifier received by the mobile station within the paging message. This enables the assignment of a paging response channel to the mobile unit in accordance with the priority established by the call priority identifier. The response message is then transmitted to the base station over the assigned paging response channel.

Call setup procedures and traffic channel assignment are completed between the mobile station and base station based upon the priority indicated by the call priority identifier. The identifier is thus included in each channel assignment request.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
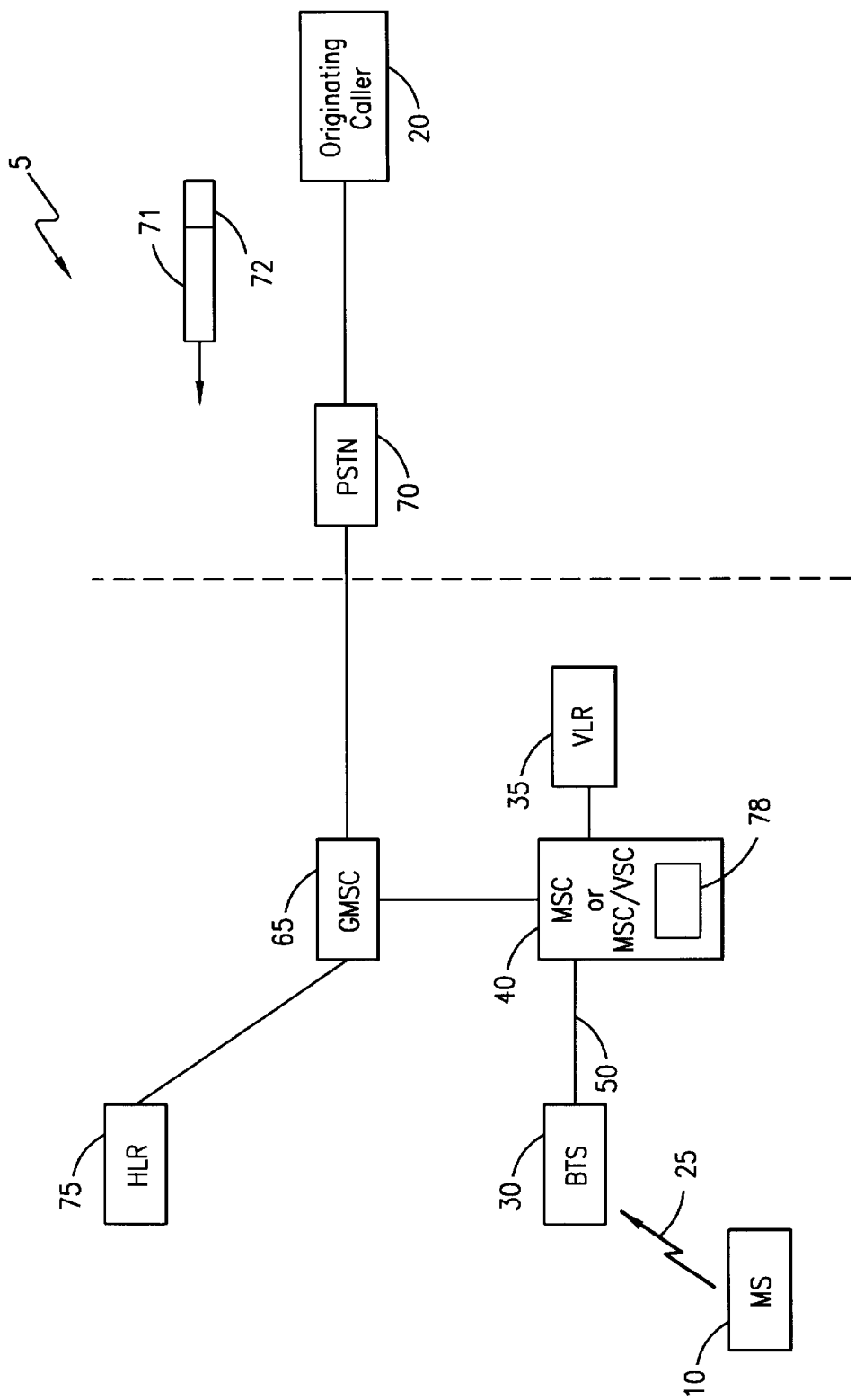
FIG. 1 is a block diagram of a telecommunications network illustrating a call connection between a mobile station and an originating caller.

Referring now to the drawings, and more particularly, to FIG. 1, wherein there is illustrated a block diagram of the telecommunications network 5 providing a call connection between a mobile station 10 and an originating caller 20 such as a public safety answering point (PSAP). When the mobile station 10 originates a call connection towards the originating caller 20, an over the air signal 25 is received by a base transceiver station (BTS) 30 providing radio coverage for that particular geographic area associated with the requesting mobile station 10.

The received signal is forwarded to an associated mobile switching center (MSC) 40 (or MSC/VLR) and a visitor location register (VLR) 35 via an interface link connected therebetween. The MSC 40 is connected to the BTS 30 via a communications link 50. The MSC 40 and VLR 35 are often co-located with each other, and are hereinafter collectively referred to as a MSC/VLR. The serving MSC/VLR 40/35 recognizes that the mobile station 10 is requesting a call connection and establishes a call connection with the originating caller 20 through a gateway mobile switching center (GMSC) 65 and to an external network 70 such as a PSTN. This call connection is carried out using no prioritization of channel assignments. Thus, call setup can be affected by the amount of traffic served by the BTS 30.

A connection between the originating caller 20 and the mobile station 10 involves the originating caller dialing the number of the mobile station to initiate a paging message 71. The paging message 71 includes a call priority identifier 72 indicating a priority that is to be associated with all call setup activities involving the call. The paging message 71 is routed through the GMSC 65 to the home location register (HLR) 75 of the mobile station 10. The HLR 75 is interrogated for information about the location of the mobile station 10 and the MSC/VLR 40/35 presently serving the mobile station. Upon receipt of this information, the GMSC 65 routes the call to the identified MSC/VLR 40/35. The MSC/VLR 40/35 then utilizes the base transceiver station (BTS) 30 to connect the originating caller 20 to the mobile station 10.

Connection of the call between the BTS 30 and the mobile station 10 is normally based upon the order in which the calls were received. However, inclusion of the call priority identifier 72 within the paging request grants the call priority processing. At the MSC/VLR 40/35 servicing the mobile station 10, the call priority identifier 72 is compared to a list 78 of approved emergency/priority numbers indicating that a call is to be given priority treatment. This list may be preselected or consist of a number of dynamically updated numbers. If the call priority identifier 72 matches an entry from the list 78, the call is given immediate access to the logical channels between the BTS 30 and the mobile station 10 to enable call connection. Use of the call priority identifier 72 enables the call be given the highest priority and bump lower priority calls from the calling que.

Alternatively, priority may be granted by comparison of the A number of the originating calling source attempting reconnection to a priority list 78. If the number is listed on the priority list 78, the call is granted priority treatment. Thus, emergency operators and other types of emergency numbers will always be included on the priority list 78 and granted priority call processing. The important part is that the priority indication be provided or generated in some manner, such that the paging message be provided priority call processing.

Figure 2:
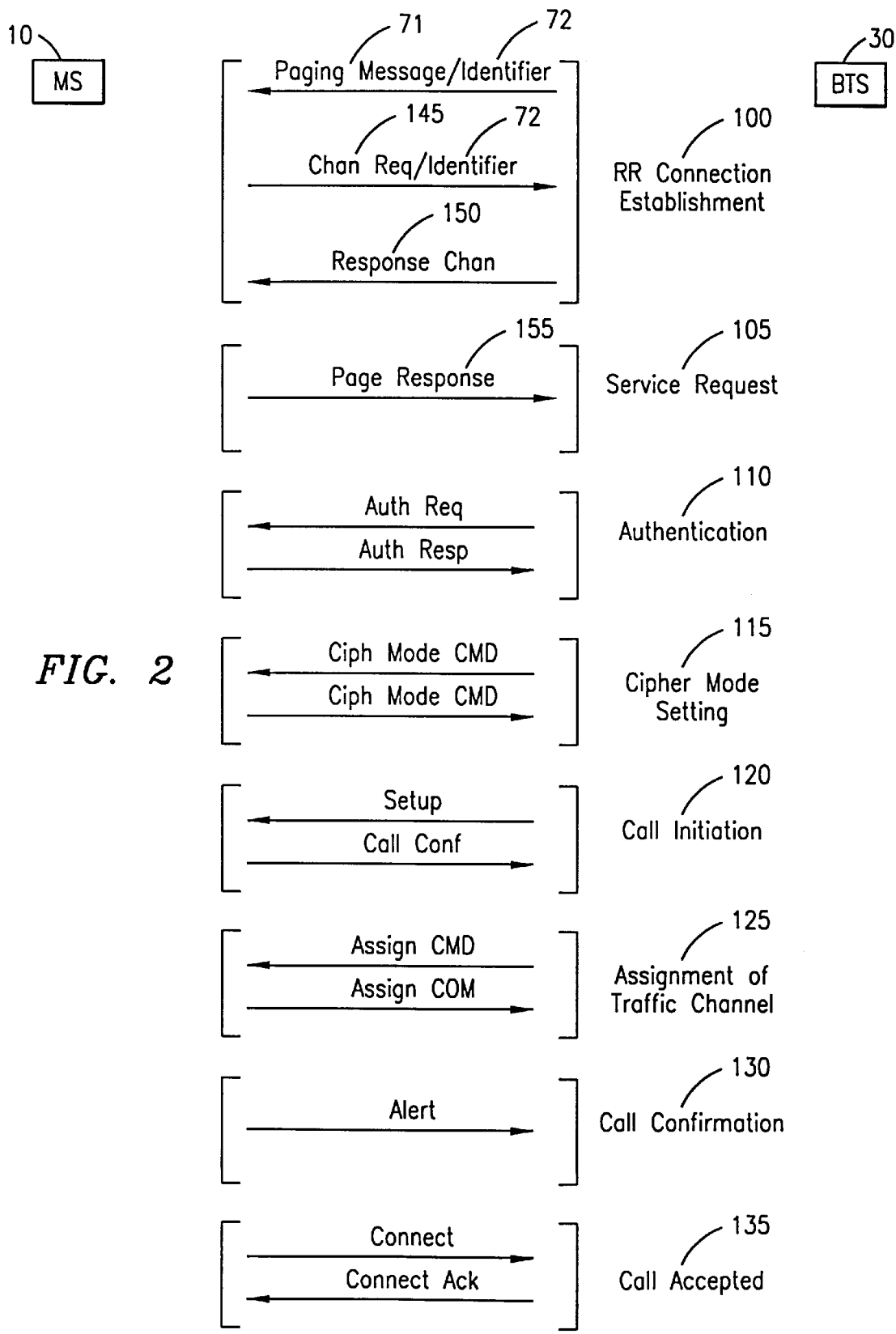
FIG. 2 is an illustration of the manner in which a call setup between a mobile station and a cellular network is provided using a call priority identifier.

Referring now to FIG. 2, there is illustrated a manner in which a connection is established between the base transceiver station 30 and the mobile station 10. The call setup procedure consist of eight steps, including receive ready connection establishment 100, service request 105, authentication 110, ciphering mode setting 115, call initiation 120, assignment of traffic channel 125, call confirmation 130, and call acceptance 135. After confirmation of the call priority identifier 72, the base transceiver station 30 transmits the paging request 71 to the mobile station 10 over a paging channel. Included within the paging message 71 is the call priority identifier 72.

When the mobile station 10 recognizes the paging message 71, the mobile station generates a channel request 145 to the BTS 30 on the random access channel (RACH) 150. Included with the channel request is the call priority identifier 72. By including the call priority identifier 72 within the channel request 145, the MSC 40 knows to give priority to the assignment of a slow dedicated control channel (SDCCH) 150 to the mobile station 10 for paging response 155.

The paging response 155 is transmitted over the assigned SDCCH 150 to the base transceiver station 30 and requests a call connection. The paging response 155 will also include the call priority identifier 72 to enable prioritized call setup. Once the call setup has been requested, the remaining call setup procedures 110–135 are performed between the mobile station 10 and the BTS 30. The call setup procedures 110–135 are prioritized in each instance where call processing involves assignment of a traffic or control channel to carry speech or control data between the originating caller 20 and the mobile station 10. Use of the call priority identifier 72 enables assignment of channels to the call on a priority basis to facilitate call connection.

Figure 3:
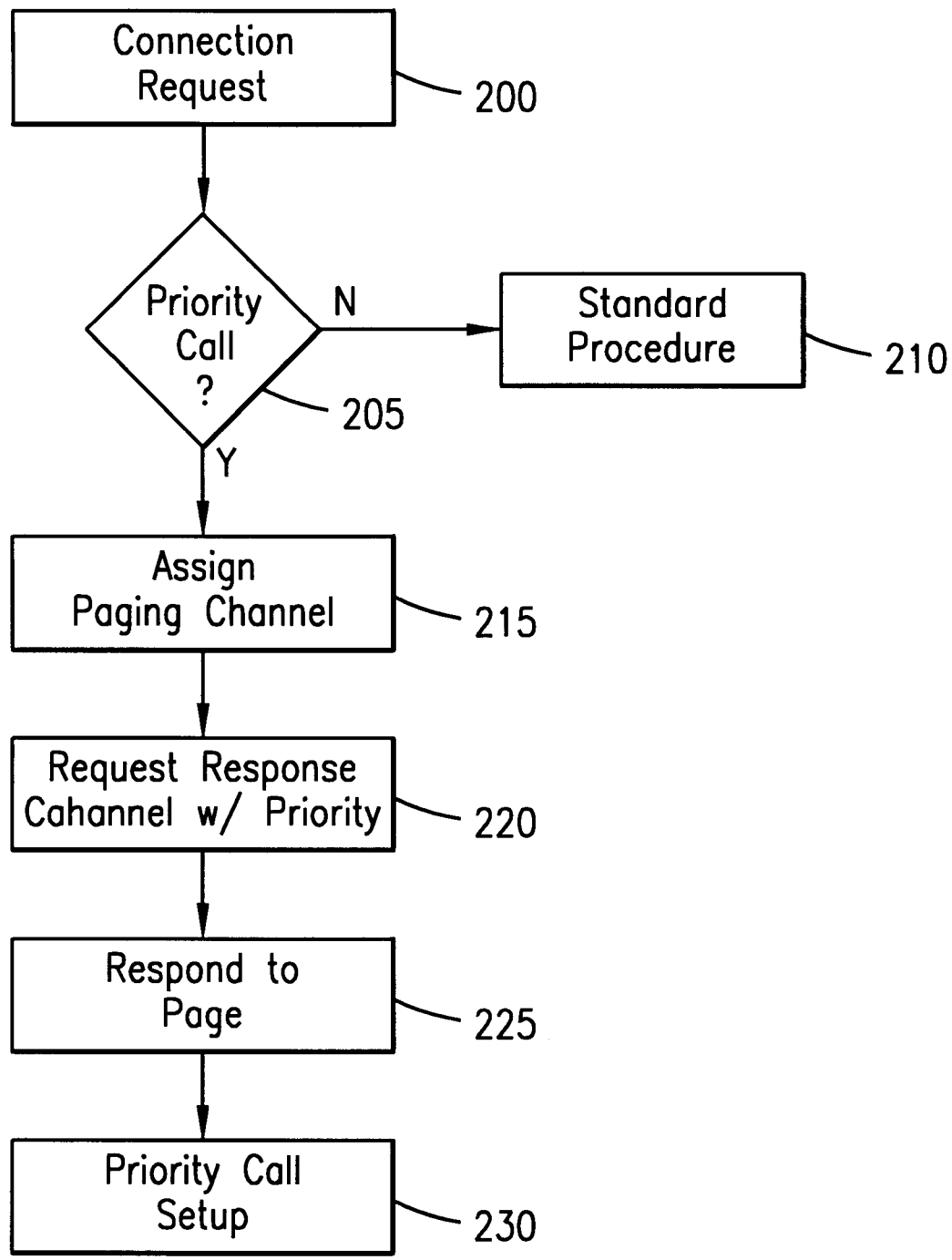
FIG. 3 is a flowchart describing the method for priority call connection.

Referring now to FIG. 3, there is illustrated a flow chart describing the manner for connecting an originating caller 20 to a mobile station 10. Initially at step 200, a connection request is transmitted to an MSC 40 serving the mobile station 10. The request includes a call priority identifier 72 indicating a priority to be assigned to processing of the call. At the MSC 40 the call priority identifier 72 is compared at step 205 to a list 78 of priority numbers to determine whether or not priority processing is to be granted to the call. If not, the call is processed according to standard procedures at step 210.

Otherwise, at step 215, a paging channel is assigned to the mobile station 10 according to a high priority. Once the mobile station 10 has received the paging request, the mobile station requests at step 220 a channel to respond to the page. This request for a channel also includes the call priority identifier 72 ensuring a priority assignment of the paging response channel to the request. Once the channel has been assigned, the mobile station responds to the page at step 225, and the remaining call setup steps are processed at step 230 according to the call priority identifier 72.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for enabling prioritized call connection between an originating caller and a mobile station comprising the steps of:

transmitting a paging message including a call priority identification from an originating caller to the mobile station according to a priority indicated by the call priority identification;

responding to the paging message from the mobile station according to the priority indicated by the call priority identification, the response including the call priority identification to enable priority treatment of the response; and setting up a call connection between the mobile station and the originating caller according to the priority indicated by the call priority identification.

2. The method of claim 1 wherein the step of transmitting further comprises the steps of:

transmitting the paging message to a base station;

generating a paging message to a mobile station from the base station, the paging message including the call priority identification; and forwarding the paging message to the mobile station on a paging channel assigned on the basis of a priority indicated by the call priority identification.

3. The method of claim 1 wherein the step responding further including the steps of:

requesting assignment of a paging response channel, the request including the call priority identification;

assigning a paging response channel to the mobile station according to a priority identified by the call priority identification; and transmitting a response to the paging message over the assigned paging response channel.

4. The method of claim 1 wherein the step of setting up a call connection comprises:

assigning a traffic channel between the originating caller and the mobile station according to a priority indicated by the call priority identification; and transmitting call traffic over the assigned traffic channel.

5. The method of claim 1 further including the step of comparing the call priority identification included with the paging message to confirm a priority associated with the call priority identification.

6. A method for enabling prioritized call connection between an originating caller and a terminating caller, comprising the steps of:

transmitting a paging message including a call priority identifier from an originating caller to a terminating caller according to a priority established by the call priority identifier;

comparing the call priority identifier included within the paging message to a list of call priority identifiers to confirm the validity of the call priority identifier;

requesting assignment of a paging response channel for responding to the paging message, the request including the call priority identifier;

assigning a paging response channel to the terminating caller according to the priority established by the call priority identifier;

transmitting a response the paging message over the assigned paging response channel; and setting up a call connection between the terminating caller and the originating caller according to the priority indicated by the call priority identifier.

7. The method of claim 6 wherein the step of transmitting further comprises the steps of:

transmitting the paging message to a base station;

generating a paging message to the mobile station from the base station, the paging message including the call priority identifier; and forwarding the paging request to the mobile station on a paging channel assigned on the basis of a priority established by the call priority identifier.

8. A method for enabling prioritized call connection between a base station and a mobile station, comprising the steps of:

generating a page to the mobile station from the base station according to a priority indicated by a call priority identifier, the page including the call priority identifier;

forwarding the page to the mobile station on a paging channel assigned on the basis of a priority established by the call priority identifier;

assigning a paging response channel to the mobile station according to the priority established by the call priority identifier contained within the page;

transmitting a response to the page over the assigned paging response channel, the response to the page including the call priority identifier; and Setting up a call connection between the base station and the mobile station according to the priority established by the call priority identifier.

9. The method of claim 8 wherein the step of setting up a call connection comprises:

assigning a traffic channel between the base station and the mobile station according to the priority of the call priority identifier; and transmitting call traffic over the assigned traffic channel.

10. The method of claim 9 further including the step of comparing the call priority identifier with a valid list of call priority identifiers to confirm the validity of the call priority identifier.

* * * * *